(12) United States Patent
Liu (10) Patent No.: US 11,150,509 B2
(45) Date of Patent: Oct. 19, 2021

(54) BACKLIGHT MODULE (71) Applicant: WUHAN CHINA STAR OPTOELECTRONICS TECHNOLOGY CO., LTD., Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 465 days.

(21) Appl. No.: 16/308,896

(22) PCT Filed: Nov. 23, 2018

(86) PCT No.: PCT/CN2018/117182
§ 371 (c)(1),
(2) Date: Dec. 11, 2018

(87) PCT Pub. No.: WO2020/056912
PCT Pub. Date: Mar. 26, 2020

(65) Prior Publication Data
US 2021/0223623 A1 Jul. 22, 2021

(30) Foreign Application Priority Data

Sep. 19, 2018 (CN) .......................... 201811091203.0

(51) Int. Cl.
*G02F 1/00* (2006.01)
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133614* (2021.01)

(58) Field of Classification Search
CPC ........ G02F 1/133603; G02F 1/05; G02F 1/06; G02F 1/14
See application file for complete search history.

(56) References Cited

U.S. PATENT DOCUMENTS

| 2012/0218752 | A1* | 8/2012 | Sumitani | G02F 1/133605 362/235 |
| 2015/0124434 | A1* | 5/2015 | Chang | G02F 1/133605 362/97.3 |
| 2018/0182940 | A1* | 6/2018 | Yamamoto | H01L 33/504 |
| 2018/0284331 | A1* | 10/2018 | Rantala | C09D 7/68 |

(Continued)

FOREIGN PATENT DOCUMENTS

| CN | 105319773 A | 2/2016 |
| CN | 108279532 A | 7/2018 |

*Primary Examiner* — Gerald J Sufleta, II (57) ABSTRACT

A backlight module is provided, including: a light source module configured to emit a plurality of point lights; a diffuser plate configured to homogenize light emitted from the light source module; and a reflective plate disposed over the light source module and located between the light source module and the diffuser plate, where the reflective plate is provided with a plurality of through holes corresponding to the plurality of point lights, such that the plurality of point lights emitted from the light source module enter the diffuser plate through the corresponding through holes of the reflective plate.

13 Claims, 4 Drawing Sheets (56) References Cited

U.S. PATENT DOCUMENTS

| | | | |
|---|---|---|---|
| 2019/0004371 A1* | 1/2019 | Lee | G02F 1/133605 |
| 2019/0094616 A1* | 3/2019 | Kim | G02B 6/0055 |
| 2019/0265549 A1* | 8/2019 | Chen | G02F 1/133605 |
| 2020/0073174 A1* | 3/2020 | Yasunaga | G02F 1/133605 |
| 2020/0348457 A1* | 11/2020 | Uto | G02F 1/133605 |

* cited by examiner

BACKLIGHT MODULE

FIELD OF DISCLOSURE

The present disclosure relates to backlight modules, and more particularly to a direct-lit backlight module.

BACKGROUND

In the field of display technology, flat panel display devices are widely used in mobile phones, televisions, personal digital assistants, digital cameras, notebook computers, desktop computers, etc. due to their high image quality, power saving, and thin body. Electronic products have become the mainstream in display devices.

At present, common flat panel display devices mainly include: a liquid crystal display device (LCD) and an organic light-emitting diode (OLED). Thin film transistors (TFTs) are main driving components of LCD and OLED display devices. In order to compete with OLED display technology, LCD display technology is dedicated to improving the display gamut range, contrast, brightness and other performance indicators. However, in the LCD display technology, the use of a conventional edge-lit backlight with an LCD has made it difficult to improve overall performance. Specifically, when the edge-lit backlight is applied to a medium-sized or large-sized LCD, the weight and cost of the light guide plate increase as the size increases, and the brightness and homogenization of the light emission are not satisfactory. At the same time, the edge-lit backlight LCD cannot realize the dynamic control of the area of the LCD because of the light guide plate, and can only realize simple one-dimensional dimming. Moreover, in order to increase the display color gamut of the LCD, it is necessary to sacrifice the brightness, and the improvement of static contrast of the LCD also falls into a bottleneck.

Accordingly, it is necessary to provide a backlight module to solve the technical problems in the prior art.

SUMMARY OF THE DISCLOSURE

In order to solve technical problems mentioned above, an object of the present disclosure is to provide a backlight module that adopts a direct-lit backlight region by region technology and can further be combined with a quantum dot backlight design. Compared with the conventional backlight structure, the present disclosure can effectively improve the luminous efficiency of the quantum dots, thereby increasing the brightness of the display device.

In order to achieve the object described above, the present disclosure provides a backlight module, including: a light source module configured to emit a plurality of point lights; a reflective plate disposed over the light source module; a brightness enhancement film disposed on the reflective plate; and a diffuser plate disposed on the brightness enhancement film configured to homogenize light emitted from the light source module, where the reflective plate is disposed between the light source module and the brightness enhancement film, and the reflective plate is provided with a plurality of through holes corresponding to the plurality of point lights, such that the plurality of point lights emitted from the light source module enter the brightness enhancement film and the diffuser plate through the corresponding through holes of the reflective plate; and where the backlight module further includes a quantum dot layer disposed on the reflective plate configured to emit a corresponding color light after being excited by the point lights.

In one preferred embodiment of the present disclosure, the quantum dot layer is disposed over an entire surface of the reflective plate.

In one preferred embodiment of the present disclosure, the quantum dot layer is constituted of a plurality of first patterned units, and the plurality of first patterned units are spaced apart from each other, and the first patterned unit is located in a corresponding through hole of the reflective plate.

In one preferred embodiment of the present disclosure, the backlight module further includes an optical functional film disposed between the quantum dot layer and the light source module, where the optical functional film has a transmittance of greater than 98% for blue light, and a reflectance of greater than 95% for red light and green light.

In one preferred embodiment of the present disclosure, the optical functional film is disposed over an entire surface of the reflective plate and disposed between the reflective plate and the light source module.

In one preferred embodiment of the present disclosure, the optical functional film is constituted of a plurality of second patterned units, and the plurality of second patterned units are spaced apart from each other, and the second patterned unit is located in a corresponding through hole of the reflective plate.

In one preferred embodiment of the present disclosure, the second patterned unit of the optical functional film is located closer to the light source module than the first patterned unit of the quantum dot layer.

In one preferred embodiment of the present disclosure, the optical functional film includes a blue light transmission film.

The present disclosure also provides a backlight module, including: a light source module configured to emit a plurality of point lights; a diffuser plate configured to homogenize light emitted from the light source module; and a reflective plate disposed over the light source module and located between the light source module and the diffuser plate, where the reflective plate is provided with a plurality of through holes corresponding to the plurality of point lights, such that the plurality of point lights emitted from the light source module enter the diffuser plate through the corresponding through holes of the reflective plate.

In one preferred embodiment of the present disclosure, the light source module includes a substrate and a plurality of point light sources, where the plurality of point light sources are arranged in an array on the substrate configured to emit the plurality of point lights.

In one preferred embodiment of the present disclosure, the backlight module further includes a quantum dot layer disposed on the reflective plate configured to emit a corresponding color light after being excited by the point lights.

In one preferred embodiment of the present disclosure, the quantum dot layer is disposed over an entire surface of the reflective plate.

In one preferred embodiment of the present disclosure, the quantum dot layer is constituted of a plurality of first patterned units, and the plurality of first patterned units are spaced apart from each other, and the first patterned unit is located in a corresponding through hole of the reflective plate.

In one preferred embodiment of the present disclosure, the backlight module further includes an optical functional film disposed between the quantum dot layer and the light source module, where the optical functional film has a transmittance of greater than 98% for blue light, and a reflectance of greater than 95% for red light and green light.

In one preferred embodiment of the present disclosure, the optical functional film is disposed over an entire surface of the reflective plate and disposed between the reflective plate and the light source module.

In one preferred embodiment of the present disclosure, the optical functional film is constituted of a plurality of second patterned units, and the plurality of second patterned units are spaced apart from each other, and the second patterned unit is located in a corresponding through hole of the reflective plate.

In one preferred embodiment of the present disclosure, the second patterned unit of the optical functional film is located closer to the light source module than the first patterned unit of the quantum dot layer.

In one preferred embodiment of the present disclosure, the optical functional film includes a blue light transmission film.

In comparison to prior art, the present disclosure enhances light utilization of the backlight module by providing the reflective plate on the light source module that reflects the light again toward the brightness enhancement film and the diffuser plate. Also, the display gamut range is effectively increased by setting a quantum dot layer on the reflective plate. Preferably, the quantum dot layer is of a patterned design rather than a full-surface design, which effectively saves costs and reduces total amount of harmful elements, such as Ge, used. Furthermore, by adopting a design combining an optical functional film and a quantum dot layer, yellow and green light can be prevented from scattering around without decreasing the transmission of blue light, thereby improving light utilization efficiency.

DETAILED DESCRIPTION

The structure and the technical means adopted by the present disclosure to achieve the above and other objects can be best understood by referring to the following detailed description of the preferred embodiments and the accompanying drawings.

Figure 1:
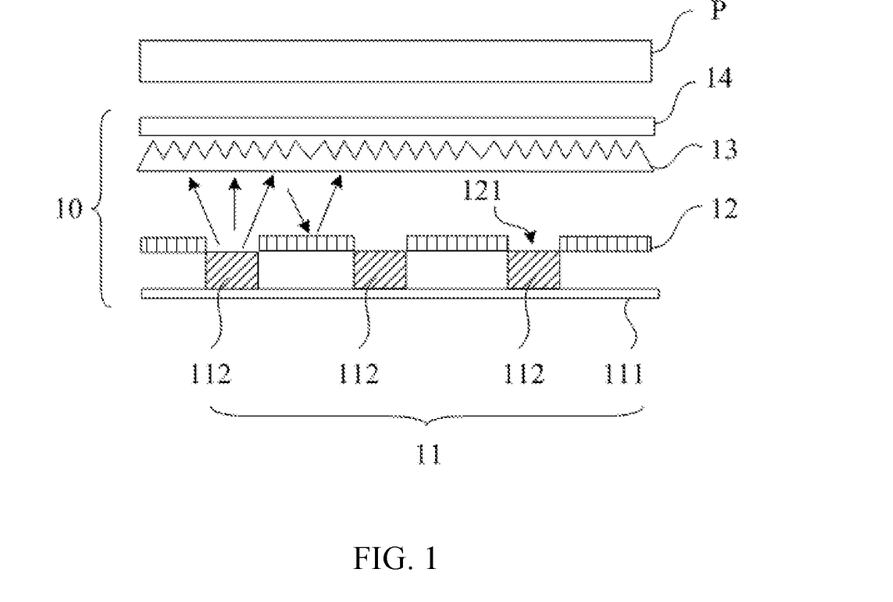
FIG. 1 shows a cross-sectional view of a backlight module in accordance with a first preferred embodiment of the present disclosure.
Figure 2:
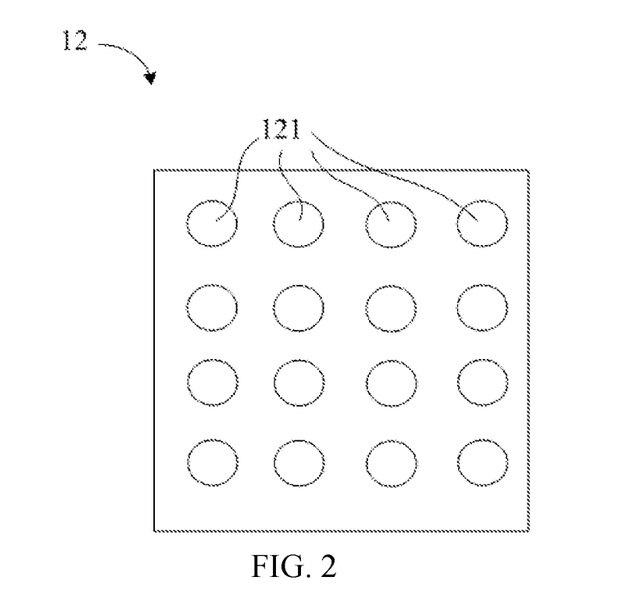
FIG. 2 shows a top view of a reflective plate of the backlight module of FIG. 1.

Referring to FIG. 1, which shows a cross-sectional view of a backlight module 10 in accordance with a first preferred embodiment of the present disclosure. The backlight module 10 can be assembled with a panel P to form a display device, and the display device can be a medium-sized or large-sized display device that can be applied to an in-vehicle display, a notebook, a television, or the like. The backlight module 10 includes a light source module 11, a reflective plate 12, a brightness enhancement film 13, and a diffuser plate 14 which are sequentially disposed. The light source module 11 includes a substrate 111 and a plurality of point light sources 112, where a plurality of point light sources 112 are arranged in an array on the substrate 111 for emitting a plurality of point lights. Optionally, the substrate 111 is a printed circuit board, and the point light source 112 is a light emitting diode (LED) electrically connected to the substrate 111. The reflective plate 12 is disposed on the light source module 11 for increasing brightness and savings energy. The brightness enhancement film 13 achieves the purpose of collecting light by refraction and reflection of light, thereby enhancing frontal light emission and brightness. Since the light transmitted from the point light source 112 and the reflective plate 12 is not concentrated in a traveling direction, the traveling direction of the light can be corrected by the brightness enhancement film 13, so that the overall luminance of the backlight module 10 is increased. The diffuser plate 14 is used to improve the distribution of light, such that light emitting from the light source module 11 can be more homogenized. Specifically, the diffuser plate 14 may be formed by coating a diffusing agent and a resin on a substrate, in which minute diffusion particles in the diffusing agent are uniformly dispersed between the resins. When light passes through the diffuser plate 14, the light passes through two different media with different refractive indices, namely the diffusing particles and the resin. At this time, the light will refract, scatter, and reflect, thereby scatting the light, Referring to FIG. 1 and FIG. 2, FIG. 2 shows a top view of the reflective plate 12 of the backlight module 10 of FIG. 1. The reflective plate 12 is provided with a plurality of through holes 121 corresponding to the plurality of point lights 112 of the light source module 11, so that the plurality of point lights emitted by the light source module 11 enter the brightness enhancement film 13 and the diffuser plate 14 through the corresponding through holes 121 of the reflective plate 12. It can be understood that a part of the light is reflected back to the reflective plate 12 by the brightness enhancement film 13, and the light of this part can be reflected back by the reflective plate 12 and toward the brightness enhancement film 13 and the diffuser plate 14, thereby improving light utilization of the backlight module 10. It should be noted that the through hole 121 may be a circle, a rectangle, a polygon, or the like, and is not limited thereto.

In the present disclosure, in order to improve the contrast, the backlight module 10 adopts a direct-lit backlight region by region technology. The light source module 11 is divided into multi-region independent control units, and the brightness of the light source module 11 of each region is automatically adjusted according to the brightness information in each frame image, and combined with dynamic image processing technology, thereby improving dynamic contrast, and significant increasing the quality of image display.

Figure 3:
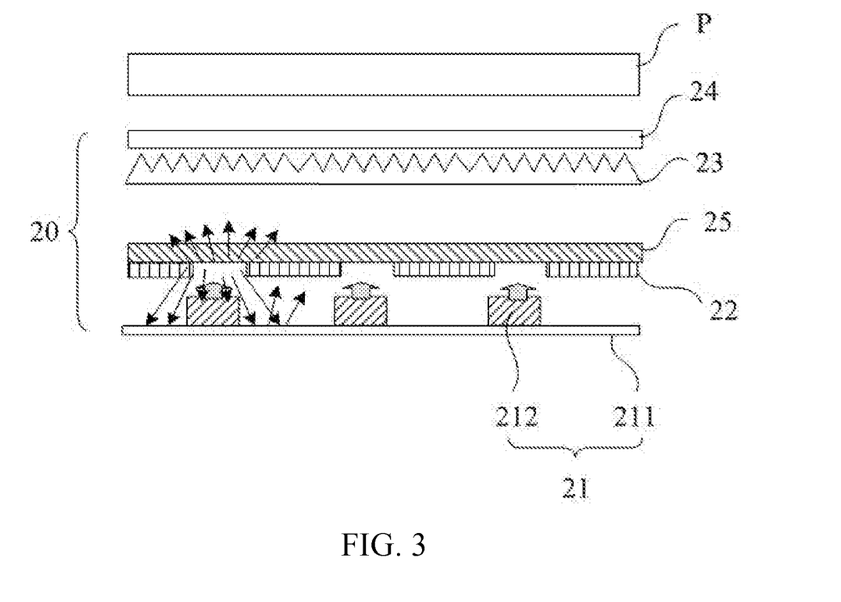
FIG. 3 shows a cross-sectional view of a backlight module in accordance with a second preferred embodiment of the present disclosure.

Referring to FIG. 3, which shows a cross-sectional view of a backlight module 20 in accordance with a second preferred embodiment of the present disclosure. The backlight module 20 can be assembled with a panel P to form a display device. The backlight module 20 includes a light source module 21, a reflective plate 22, a quantum dot layer 25, a brightness enhancement film 23, and a diffuser plate 24, where the light source module 21 includes a substrate 211 and a plurality of point light sources 212. The structure and function of the light source module 21, the reflective plate 22, the brightness enhancement film 23, and the diffuser plate 24 of the second preferred embodiment are substantially the same as the light source module 11, the reflective plate 12, the brightness enhancement film 13, and diffuser plate 14 of the first preferred embodiment, and will not be described here again.

As shown in FIG. 3, the quantum dot layer 25 is disposed over the entire surface of the reflective plate 22 between the reflective plate 22 and the brightness enhancement film 23 for emitting corresponding color light after being excited by the point lights from the light source module 21. In the backlight module 20 of the second preferred embodiment of the present disclosure, the display gamut range can be effectively increasing by setting the quantum dot layer 25, for example, to meet ITU BT.2020 image signal color gamut standard.

Figure 4:
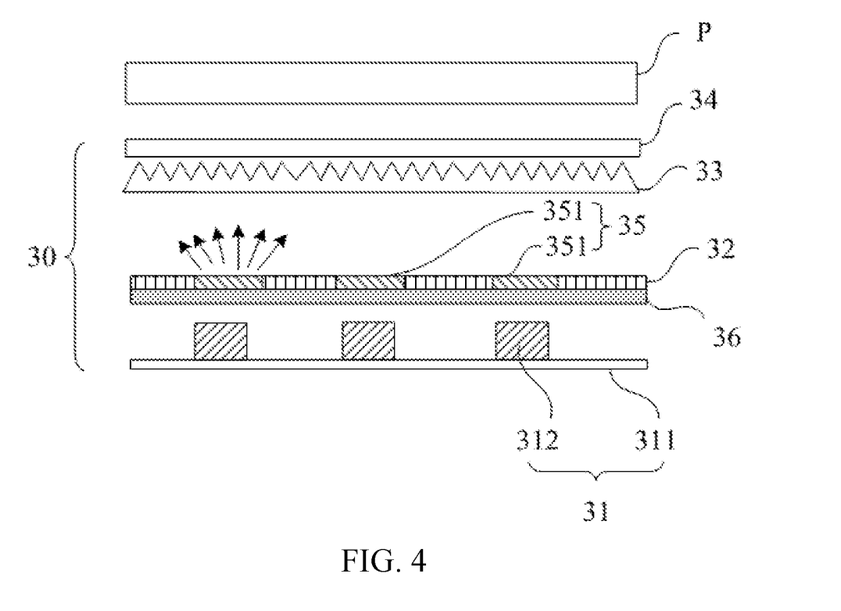
FIG. 4 shows a cross-sectional view of a backlight module in accordance with a third preferred embodiment of the present disclosure.

Referring to FIG. 4, which shows a cross-sectional view of a backlight module 30 in accordance with a third preferred embodiment of the present disclosure. The backlight module 30 can be assembled with a panel P to form a display device. The backlight module 30 includes a light source module 31, an optical functional film 36, a reflective plate 32, a quantum dot layer 35, a brightness enhancement film 33, and a diffuser plate 34, where the light source module 31 includes a substrate 311 and a plurality of point light sources 312. The structure and function of the light source module 31, the reflective plate 32, the brightness enhancement film 33, and the diffuser plate 34 of the third preferred embodiment are substantially the same as the light source module 11, reflective plate 12, brightness enhancement film 13, and the diffuser plate 14 of the first preferred embodiment, and will not be described here again.

As shown in FIG. 4, the quantum dot layer 35 is constituted of a plurality of first patterned units 351, and the plurality of first patterned units 351 are spaced apart from each other. Each of the first patterned unit 351 is located in a corresponding through hole of the reflective plate 32. The quantum dot layer 35 is used to emit corresponding color light after being excited by the point lights emitted by the light source module 31. The quantum dot layer 35 can effectively improve the display gamut range, for example, to meet the ITU BT.2020 image signal gamut standard. Preferably, the shape and size of the first patterned unit 351 correspond to the shape and size of the corresponding through hole of the reflective plate 32, that is, the edge of each first patterned unit 351 is closely connected to a hole wall of the through hole of the reflective plate 32, It ensures that the light passing through the through hole will pass through the quantum dot layer 35. In the present embodiment, since the quantum dot layer 35 is designed in a pattern rather than a full-surface design, it is possible to effectively save costs and reduce the total amount of harmful substances elements, such as germanium (Ge).

Figure 5:
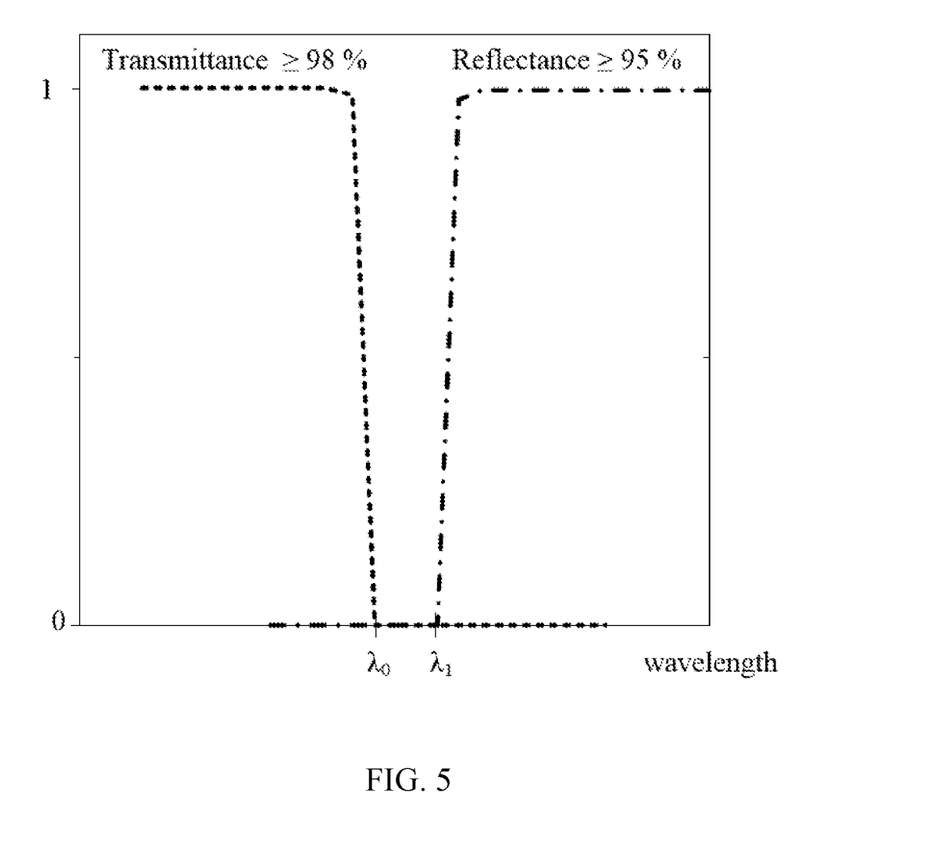
FIG. 5 is a graph showing the wavelengths of the transmittance and reflectance of an optical functional film of the backlight module of FIG. 4.

As shown in FIG. 4, the optical functional film 36 is disposed over the entire surface of the reflective plate 32 and between the quantum dot layer 35 and the light source module 31. Referring to FIG. 5, which shows a graph of wavelengths corresponding to the transmittance and reflectance of the optical functional film 36 of the backlight module 30 of FIG. 4. A symbol "$\lambda_0$" in FIG. 5 denotes a transmission cutoff wavelength, and a symbol "$\lambda_1$" denotes a reflection cutoff wavelength. When the optical functional film 36 of FIG. 4 is implemented by a blue light transmission film (BLTF), the optical functional film 36 has a transmittance of more than 98% for blue light, that is, the optical functional film 36 has a transmittance of more than 98% in a wavelength range of about 450 nm to 480 nm. Also, the optical function film 36 has a reflectance of more than 95% for red and green light, that is, the optical function film 36 has a light reflectance of more than 95% in a wavelength range of about 500 nm to 750 nm. In the present embodiment, by adopting a design combining the optical functional film 36 and the quantum dot layer 35, yellow and green light can be prevented from scattering around without decreasing the transmission of blue light, thereby increasing light utilization efficiency. Specifically, since the quantum dot layer 35 emits the corresponding color light after being excited with light, and the color light advances toward all directions, and part of the light toward the reflective plate 32 and the light source module 31 passes through the optical functional film 36, and then is reflected back and advances toward in the direction of the brightness enhancement film 33. It does not reflect back and forth between the reflective plate 32 and the light source module 31, which improves the light utilization efficiency and overall brightness of the backlight module 30.

Figure 6:
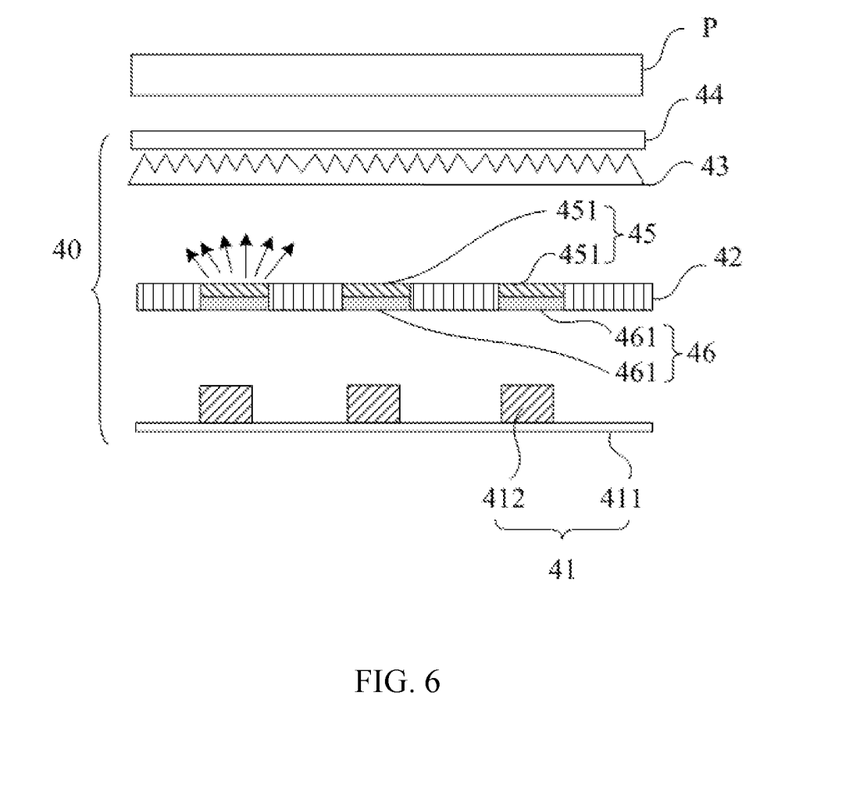
FIG. 6 shows a cross-sectional view of a backlight module in accordance with a fourth preferred embodiment of the present disclosure.

Referring to FIG. 6, which shows a cross-sectional view of a backlight module 40 in accordance with a fourth preferred embodiment of the present disclosure. The backlight module 40 can be assembled with a panel P to form a display device. The backlight module 40 includes a light source module 41, an optical functional film 46, a reflective plate 42, a quantum dot layer 45, a brightness enhancement film 43, and a diffuser plate 44, where the light source module 41 includes a substrate 411 and a plurality of point light sources 412. The structure and function of the light source module 41, the reflective plate 42, the brightness enhancement film 43, and the diffuser plate 44 of the fourth preferred embodiment are substantially the same as the light source module 11, reflective plate 12, brightness enhancement film 13, and the diffuser plate 14 of the first preferred embodiment, and will not be described here again.

As shown in FIG. 6, the quantum dot layer 45 is constituted of a plurality of first patterned units 451, and the plurality of first patterned units 451 are spaced apart from each other. Each of the first patterned unit 451 is located in a corresponding through hole of the reflective plate 42. The quantum dot layer 45 is used to emit corresponding color light after being excited by the point lights emitted by the light source module 41. The quantum dot layer 45 can effectively improve the display gamut range, for example, to meet the ITU BT.2020 image signal gamut standard. Preferably, the shape and size of the first patterned unit 451 correspond to the shape and size of the corresponding through hole of the reflective plate 42, that is, the edge of each first patterned unit 451 is closely connected to a hole wall of the through hole of the reflective plate 42, It ensures that the light passing through the through hole will pass through the quantum dot layer 45. In the present embodiment, since the quantum dot layer 45 is designed in a pattern rather than a full-surface design, it is possible to effectively save costs and reduce the total amount of harmful substances elements, such as germanium (Ge).

As shown in FIG. 6, the optical functional film 46 is constituted of a plurality of second patterned units 461, and the plurality of second patterned units 461 are spaced apart from each other. Each second patterned unit 461 is located in a corresponding through hole of the reflective plate 42. Preferably, the shape and size of the second patterned unit 461 correspond to the shape and size of the corresponding through hole of the reflective plate 42, that is, the edge of each second patterned unit 461 is closely connected to the hole wall of the through hole of the reflective plate 42. It is ensured that the light passing through the through hole will pass through the second patterned unit 461 of the optical functional film 46. The second patterned units 461 of the optical functional film 46 are located closer to the light source module 41 than the first patterned unit 451 of the quantum dot layer 45. Preferably, when the optical functional film 46 of this embodiment is implemented by using a blue light transmission film, the optical functional film 46 has a transmittance of greater than 98% for blue light, that is, the optical functional film 46 has a transmittance of greater than 98% in the wavelength range of about 450 nm to 480 nm. Also, the optical functional film 46 has a reflectance of more than 95% for red and green light, that is, the optical functional film 46 has a reflectance greater than 95% in a wavelength range of about 500 nm to 750 nm. In the present embodiment, the optical functional film 46 is designed in a pattern rather than a full-surface design, which can effectively save costs.

As shown in FIG. 6, by adopting a design combining the optical functional film 46 and the quantum dot layer 45, yellow and green light can be prevented from scattering around without decreasing the transmission of blue light, thereby increasing light utilization efficiency. Specifically, since the quantum dot layer 45 emits the corresponding color light after being excited with light, and the color light advances toward all directions, and part of the light toward the reflective plate 42 and the light source module 41 passes through the optical functional film 46, and then is reflected back and advances toward in the direction of the brightness enhancement film 43. It does not reflect back and forth between the reflective plate 42 and the light source module 41, which improves the light utilization efficiency and overall brightness of the backlight module 40.

In summary, the present disclosure enhances light utilization of the backlight module by providing the reflective plate on the light source module that reflects the light again toward the brightness enhancement film and the diffuser plate. Also, the display gamut range is effectively increased by setting a quantum dot layer on the reflective plate. Preferably, the quantum dot layer is of a patterned design rather than a full-surface design, which effectively saves costs and reduces total amount of harmful elements, such as Ge, used. Furthermore, by adopting a design combining an optical functional film and a quantum dot layer, yellow and green light can be prevented from scattering around without decreasing the transmission of blue light, thereby improving light utilization efficiency.

The above descriptions are merely preferable embodiments of the present disclosure. Any modification or replacement made by those skilled in the art without departing from the principle of the present disclosure should fall within the protection scope of the present disclosure.

What is claimed is:

1. A backlight module, comprising:
   a light source module configured to emit a plurality of point lights;
   a reflective plate disposed over the light source module;
   a brightness enhancement film disposed on the reflective plate; and
   a diffuser plate disposed on the brightness enhancement film configured to homogenize light emitted from the light source module,
   wherein the reflective plate is disposed between the light source module and the brightness enhancement film, and the reflective plate is provided with a plurality of through holes corresponding to the plurality of point lights, such that the plurality of point lights emitted from the light source module enter the brightness enhancement film and the diffuser plate through the corresponding through holes of the reflective plate;
   wherein the backlight module further comprises a quantum dot layer disposed on the reflective plate configured to emit a corresponding color light after being excited by the point lights;
   wherein the quantum dot layer is constituted of a plurality of first patterned units, and the plurality of first patterned units are spaced apart from each other, and the first patterned unit is located in a corresponding through hole of the reflective plate; and
   wherein the backlight module further comprises an optical functional film disposed between the quantum dot layer and the light source module, wherein the optical functional film has a transmittance of greater than 98% for blue light, and a reflectance of greater than 95% for red light and green light.

2. The backlight module as claimed in claim 1, wherein the quantum dot layer is disposed over an entire surface of the reflective plate.

3. The backlight module as claimed in claim 1, wherein the optical functional film is disposed over an entire surface of the reflective plate and disposed between the reflective plate and the light source module.

4. The backlight module as claimed in claim 1, wherein the optical functional film is constituted of a plurality of second patterned units, and the plurality of second patterned units are spaced apart from each other, and the second patterned unit is located in a corresponding through hole of the reflective plate.

5. The backlight module as claimed in claim 4, wherein the second patterned unit of the optical functional film is located closer to the light source module than the first patterned unit of the quantum dot layer.

6. The backlight module as claimed in claim 1, wherein the optical functional film comprises a blue light transmission film.

7. A backlight module, comprising:
   a light source module configured to emit a plurality of point lights;
   a diffuser plate configured to homogenize light emitted from the light source module;
   a reflective plate disposed over the light source module and located between the light source module and the diffuser plate, wherein the reflective plate is provided with a plurality of through holes corresponding to the plurality of point lights, such that the plurality of point lights emitted from the light source module enter the diffuser plate through the corresponding through holes of the reflective plate;
   a quantum dot layer disposed on the reflective plate configured to emit a corresponding color light after being excited by the point lights, wherein the quantum dot layer is constituted of a plurality of first patterned units, and the plurality of first patterned units are spaced apart from each other, and the first patterned unit is located in a corresponding through hole of the reflective plate; and
   an optical functional film disposed between the quantum dot layer and the light source module, wherein the optical functional film has a transmittance of greater than 98% for blue light, and a reflectance of greater than 95% for red light and green light.

8. The backlight module as claimed in claim 7, wherein the light source module comprises a substrate and a plurality of point light sources, wherein the plurality of point light sources are arranged in an array on the substrate configured to emit the plurality of point lights.

9. The backlight module as claimed in claim 7, wherein the quantum dot layer is disposed over an entire surface of the reflective plate.

10. The backlight module as claimed in claim 7, wherein the optical functional film is disposed over an entire surface of the reflective plate and disposed between the reflective plate and the light source module.

11. The backlight module as claimed in claim 7, wherein the optical functional film is constituted of a plurality of second patterned units, and the plurality of second patterned units are spaced apart from each other, and the second patterned unit is located in a corresponding through hole of the reflective plate.

12. The backlight module as claimed in claim 11, wherein the second patterned unit of the optical functional film is located closer to the light source module than the first patterned unit of the quantum dot layer.

13. The backlight module as claimed in claim 7, wherein the optical functional film comprises a blue light transmission film.

* * * * *